UNITED STATES PATENT OFFICE 2,595,763

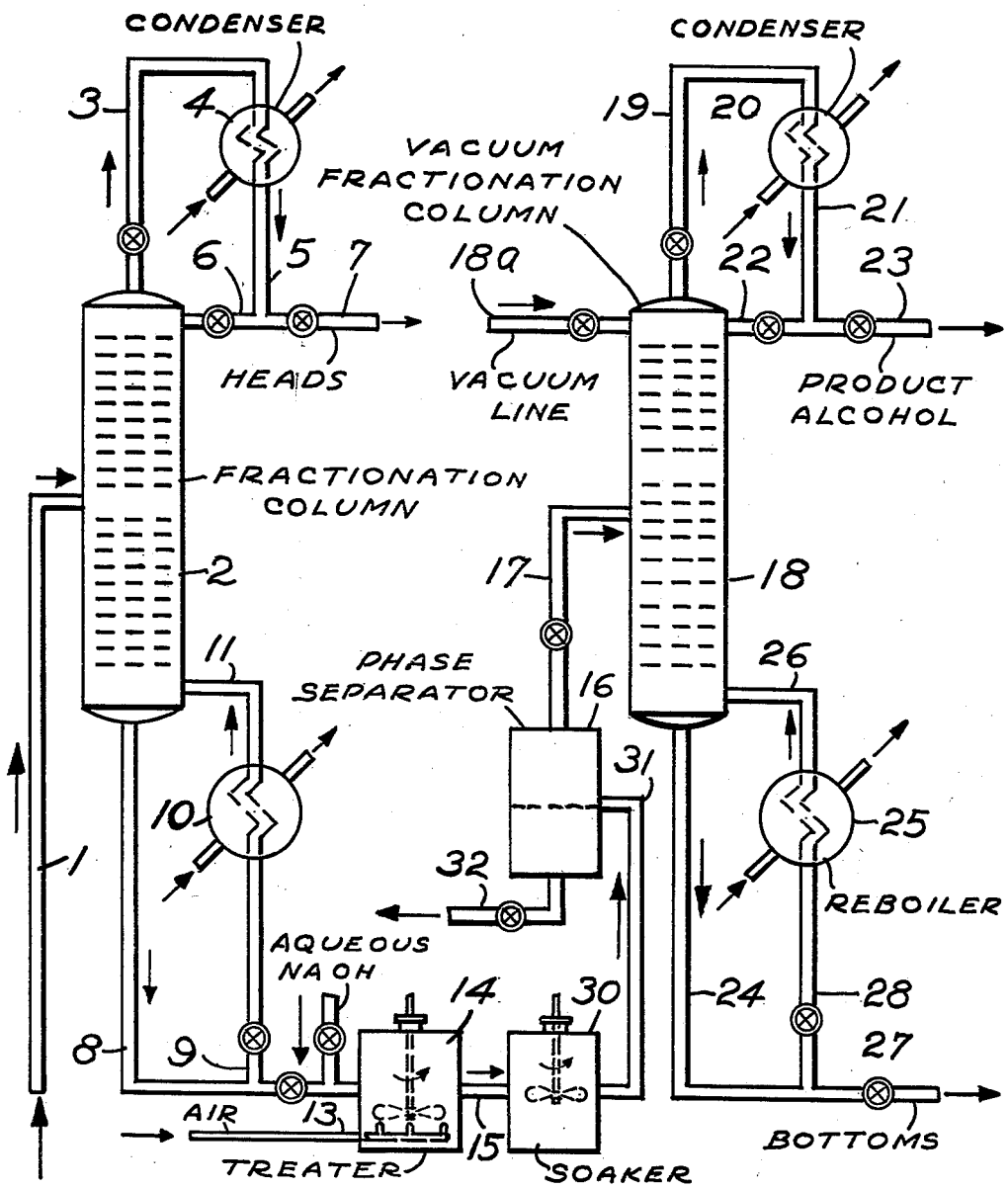

TREATMENT OF OXO ALCOHOLS BY CAUSTIC AND AIR

Carl S. Carlson and William E. Catterall, Roselle, and John H. Staib, Scotch Plains, N. J., assignors to Standard Oil Development Company, a corporation of Delaware Application December 31, 1949, Serial No. 136,282

3 Claims. (Cl. 260—638)

The present invention relates to a combination air-caustic and distillation treatment for oxygenated organic compounds prepared by the reaction of carbon monoxide and hydrogen with olefinic hydrocarbons in the presence of a carbonylation catalyst. More specifically, the invention relates to a novel method for purification of primary oxo alcohols, specifically octyl alcohols, by the critical steps of air-caustic treating the topped alcohols from which lower boiling impurities including hydrocarbons have been removed, followed by distillation of the treated alcohol, preferably under reduced pressure. This method has been found to be especially useful for reducing the sulfur content of the alcohol product made by the synthetic oxo reactions.

The air-caustic treatment is effective when applied to the topped crude alcohol or to the finished alcohol. However, this method of treating, when applied to the crude alcohol prior to a topping operation, gives a very poor quality product since low molecular weight sulfur-containing impurities are formed which distill with and degrade the finished product alcohol. The air-caustic treatment is most effective when used on the topped alcohols in conjunction with a vacuum distillation finishing step. The lowered alcohol column bottoms temperature obtained under vacuum minimizes thermal decomposition of the sulfur compounds being rejected in the bottoms stream.

Primary alcohols prepared by the oxo process are of great economic importance and of commercial interest because of their use as intermediates in the manufacture of plasticizers of the di-ester type by their esterification with dibasic acids. Previously these alcohols have been supplied mainly by such comparatively costly procedures as aldol condensation of butyraldehydes, followed by dehydration and hydrogenation of the unsaturated octyl aldehyde.

The synthesis of oxygenated organic compounds from olefinic compounds and mixtures of carbon monoxide and hydrogen under suitable conditions is well known in the art. The olefinic starting material is allowed to react in the liquid state with carbon monoxide and hydrogen in the presence of a metal catalyst, usually an iron group metal catalyst, such as a suitable cobalt compound to form, in a first or oxonation stage, organic carbonyl compounds such as aldehydes, ketones, and acids having one carbon atom more per molecule than the olefinic feed material together with some condensed higher molecular weight products such as ethers, acetals, hemiacetals, and esters. The carbonyl compounds which predominate in the product are then subjected to hydrogenation in a second stage to produce the corresponding alcohols, usually in a rather impure state together with many impurities.

Practically all types of organic compounds having an olefinic double bond may be used as starting materials to the first or oxonation stage including aliphatic olefins and diolefins, cyclo-olefins, aromatics with olefinic side chains, oxygenated compounds having olefinic double bonds, etc. The metal catalyst is preferably used in the form of a fatty acid salt soluble in the olefinic feed stock, such as the naphthenates, stearates, oleates, etc. of cobalt, iron or nickel. Suitable general reaction conditions include temperatures of about 150°–450° F., pressures of about 100 to 300 atm., $H_2:CO$ ratios of about 0.5–4.0:1, liquid feed rates of about 0.2–5 v./v./hr. and gas feed rates of about 1000–45,000 standard cu. ft. of $H_2+CO$ per barrel of liquid olefinic feed.

The hydrogenation stage may be operated at conventional hydrogenation conditions which include temperatures, pressure, gas and liquid feed rates approximately within the ranges specified above for the first stage. Various known types of hydrogenation catalysts including nickel, tungsten, molybdenum, their oxides and sulfides and others may be used. The liquid product from the hydrogenation stage is worked up by distillation to separate the desired alcohols from unconverted olefinic feed material, unhydrogenated carbonyl compounds, and hydrocarbons formed in the process.

The over-all carbonylation or so-called "oxo" reaction as outlined above, provides a particularly effective method for preparing valuable primary alcohols, particularly of the $C_4$ to $C_{20}$ range, which find large markets as intermediates for detergents and plasticizers. The $C_8$ and $C_9$ oxo alcohol products are especially preferred for use in forming esters to be used as plasticizers in light-colored or colorless plastics and resins.

For certain types of olefin feeds the reaction conditions have been found to be quite critical and specific. For instance, the conversion of heptenes to octyl alcohols by reaction with carbon monoxide and hydrogen in the presence of cobalt catalyst to form octyl aldehydes, followed by hydrogenation of the aldehydes to alcohols, has been found to give best olefin conversion levels in the first, or carbonylation stage of the reaction within a rather narrow range of temperature, when the other conditions of the reaction such as contact time, total pressure, hydrogen to carbon monoxide ratios and cobalt concentrations have been appropriately selected. Within the aldehyde reactor, under the conditions of the reaction, the dissolved catalyst is decomposed and converted to cobalt carbonyls, which probably are the active carbonylation agents. The carbonyls are soluble in the liquid within the reactor and are removed from the reaction zone mainly dissolved in the effluent product. A smaller proportion of the cobalt carbonyl is also removed from the reaction zone by the exit gas stream.

Serious difficulties have been encountered in the hydrogenation stage as a result of sulfur poisoning of the hydrogenation catalyst, when the catalysts used are those such as nickel and others which are sulfur sensitive. The most readily available olefinic feed stocks for the oxygenation reaction are selected hydrocarbon streams derived from petroleum refinery sources and these frequently have sulfur contents as high as 0.1% or even higher. Furthermore, there are a variety of other ways in which sulfur may be introduced into the alcohol product during both the oxygenation and hydrogenation stages. For instance, the fatty acids used to form the metal oxonation catalyst for the purpose of introducing the metal into the reactor as the metallic naphthenate, stearate, or oleate, will usually be found to contain small amounts of sulfur-containing compounds as contaminants, particularly when the fatty acids themselves are of petroleum origin as they frequently are. The synthesis gas used in the oxonation zone which is primarily a mixture of carbon monoxide and hydrogen also may contain sulfur impurities and, in fact, the gaseous reactants employed in both stages of the oxo reaction usually contain at least traces of sulfur impurities.

Any sulfur which is present in the crude reaction mixture containing the carbonyl compounds, is carried through the oxonation stage into the hydrogenation stage where it combines with the hydrogenation catalyst to reduce and even completely destroy catalyst activity unless sulfur insensitive catalysts are used. The sulfur sensitive catalysts are generally of the metallic type and the deactivating effect of the sulfur on their activity requires frequent reactivation, catalyst replacement, and increased amounts of a catalyst whose cost is definitely a commercial factor and may be prohibitively high. Thus, it is considered necessary for optimum operation in the hydrogenation step to employ a sulfur-insensitive catalyst. These sulfur insensitive catalysts include particularly certain metallic sulfide hydrogenating catalysts, examples of such catalysts being nickel sulfide, molybdenum sulfide and tungsten sulfide. While these catalysts have the decided advantage of avoiding the inactivation due to sulfur content of the feed stock, they also possess the disadvantage that they permit the sulfur to pass unchanged through the hydrogenation zone and, indeed, in many cases, tend to introduce additional sulfur contamination into the alcohol. Thus, the final crude alcohol may have a total sulfur content from 30 to 100 p. p. m. or in some cases, an even higher value if no sulfur clean-up operations are done.

One of the largest and most important uses developed for the synthetic alcohol products is that of producing esters suitable for plasticizers, by reaction with both aliphatic and aromatic acids or anhydrides including such examples as phthalic acid, maleic acid, adipic acid, and also phthalic and maleic acid anhydrides. Certain of the synthetic alcohols prepared by the oxonation and hydrogenation reaction are known to be especially suitable for the manufacture of ester plasticizers and particularly for use in clear plastics. These include alcohols of from $C_4$ to $C_{12}$ range such as the butyl alcohols, the octanols and the nonanols.

These esters are prepared in standard type esterification equipment employing reactors made of stainless steel or other metal or, in some cases, in glass-lined reaction vessels.

In a number of instances, particularly when the esters were produced in reactors having metallic surfaces exposed to the reacting mixtures, the products were found to be deficient as to the standards required for plasticizers, in such characteristics as odor, color, and plasticizing qualities such as the poor weathering tendency of the resins and plastics in which such plasticizers are used. These undesirable characteristics are believed to be caused by impurities present in the alcohol product and certain of them are caused particularly by the sulfur products present in the alcohol, although other materials which can affect ester color and odor include polymerized and condensed higher molecular weight impurities as well as unreduced carbonyl compounds and other non-alcoholic compounds. It has further been discovered that when sulfur compounds, especially those of the acidic type, are allowed to remain in impure alcohol or aldehyde, they act as catalysts for causing increased condensation reactions which produce acetals and other high molecular weight impurities of the undesirable type. In fact, it has been found that, in order to obtain a high grade alcohol which adequately meets all specifications, the active, color producing sulfur content should best be reduced to a value somewhere near 5 parts per million, although somewhat higher total sulfur concentrations can be tolerated, the exact limit of tolerance depending partially upon the form in which the sulfur occurs. Only certain types of the sulfur-containing impurities seem to be among the most active color formers.

In general, the sulfur in the synthetic oxo alcohols is in the form of organically combined sulfur. Although the type of organic impurities in which the sulfur occurs has not been fully determined, it is believed that the sulfur is present in a variety of forms and that it is generally deleterious in all forms when occurring in the final alcohol. Sulfur containing contaminants cause both odor and color problems as well as act as accelerators to give unwanted properties. The more highly alkylated and less acidic sulfur materials appear to be less active in producing colored impurities in stainless steel and other kinds of metallic equipment. The finished alcohol should contain a minimum of sulfur-containing compounds. It is also the best practice to remove most of the carbonyl compounds in order to obtain alcohols which give acceptable ester plasticizers. These purifications are especially necessary if the ester is manufactured in stainless steel equipment and unreacted or excess alcohol is recycled to the esterification zone. A number of types of sulfur containing impurities are believed to be present and among those probable in an isooctyl product prepared from a $C_7$ olefin, are isooctyl mercaptan, isooctyl sulfide, diethyl sulfide, diethyl disulfide, dipropyl sulfide, dipropyl disulfide, butyl sulfide, as well as the corresponding sulfinic acids, sulfonic acids, sulfoxides and sulfones. The mercaptans and less highly reduced forms of sulfur are more to be found in newly manufactured alcohols while the alcohol products which have been stored or otherwise allowed to stand will tend to darken and accumulate the more highly oxidized forms of sulfur.

In typical alcohol recycle esterification operations, a 1 to 20% molal excess of alcohol is used based on the quantity of phthalic anhydride used. The esterification reaction is carried to substantial completion by esterification for a sufficient time. The unreacted alcohol is then stripped off from the ester product under reduced pressure and blended with fresh alcohol for returning to the esterification zone. Thus, undesirable color and odor forming materials including sulfur containing impurities have the opportunity to build up during the recycle stages to a point at which they must be purged from the system before continuing the recycling operation. This presents impurity problems which occur even though the actual reaction is carried out in corrosion resistant or glass-lined equipment. The high temperature esterification is a much more severe test as to the purity and stability of the reactants and is more truly representative of typical plant scale esterification conditions.

There are regularly used a number of modified esterification procedures. Two of the main ones which are widely used for preparation of the dioctyl phthalate ester include the high temperature method in which the one mole of phthalic anhydride is heated with approximately 2 to 2.4 moles of octyl alcohol. The ester may be prepared in a number of ways. In one such method, the ester is recovered by distilling, first, the unreacted alcohol and anhydride, then finally, if it is so desired, by distilling the ester under reduced pressure. It is preferred to use the ester without distilling it, and this can be done if the alcohol used in the esterification is of sufficient purity. Although a number of finishing techniques are used, in all cases unreacted alcohol is distilled off for recycle. The catalytic method in which benzene sulfonic acid or a similar type material is used as a catalyst may be employed to give catalytic esterification at a lower temperature. The color degradation of isooctyl alcohol during esterification has also been found to be a function of time and completeness of esterification. The highly purified isooctyl alcohol products, such as those made from alcohol purified through the borate ester or prepared over a sulfur-sensitive metallic hydrogenation catalyst, show practically no color degradation in any method of esterification. Such refined methods of production are, however, prohibitively expensive for large scale commercial production. The ester color can be expressed in terms of a Hazen ester color number, a high number indicating a darkened, low quality ester product. An alcohol having a Hazen ester color of 75 to 100 is considered acceptable for commercial use. This standard test for ester color is described in the literature and is reported in A. S. T. M. D.–268–46.

In order to test the effectiveness of a treatment for removing sulfur and sulfur-containing impurities from oxo alcohol products, it has been found that accelerated esterification tests can be carried out which simulate the conditions present during large scale commercial esterifications, particularly in reactors in which the esterification mixture is exposed to metallic surfaces. One such test consists in carrying out the esterification for a suitable time and at the required temperatures in the presence of suitable metallic strips, the standard esterifications being done in glass type reactors. The strips preferably used and those which give the most reproducible results are of the KA2S stainless steel type. This test is considered to be the most rigorous and gives the most complete test of alcohol quality when the impurities being tested for are of the sulfur type.

The odor problem in both finished alcohol and ester products has also proved difficult, some distilled products have a kerosene type of petroleum odor, an odor peculiar to products having a relatively high percentage of sulfur, while others have a distinct aldehydic odor.

It has now been discovered that the undesirable characteristics of oxo alcohols containing impurities, and particularly impurities of the sulfur-containing, corrosive type, can be essentially eliminated and a good grade of alcohol consequently produced. The quality of alcohol so obtained is considered to be satisfactory for preparing plasticizers of high quality. This novel treatment process consists of a combination one-step operation which comprises treating the alcohol with a relatively mild type of oxidizing agent, that contemplated being air or an oxygen-containing gas, and simultaneously subjecting the alcohol to a caustic washing operation under critical conditions using dilute aqueous caustic solution.

It is highly important that the one-step air-caustic treatment be applied only to topped alcohol, that is, alcohol from which components boiling below the boiling point of the alcohol being treated have been removed. This is preferably done by conducting a topping operation in a regulation rectifying column from which the materials more volatile than the alcohol are removed overhead and from which the materials boiling in the range of the alcohol and above are taken as a side stream or as a bottoms fraction. If the alcohol is subjected to this treatment without a preliminary topping operation, the air-caustic treatment results in a product of distinctly poorer quality than the initial feed rather than in a product of improved color characteristics.

It has further been discovered that, for realizing the maximum advantages of this invention, it is apparently necessary to follow the aqueous caustic and air treatment by redistillation in which the alcohol product is taken as an overhead stream. If a distillation operation is not used to treat the alcohol, following the aqueous sodium hydroxide air treatment, the alcohol is found to contain undesirable impurities, some of which were originally present and some of which are formed or converted into other compounds during the caustic-air treatment.

While it is not known with complete certainty just what beneficial effects this treating method exerts in order to produce the high grade alcohol which is relatively free of undesirable impurities causing ester color and odor, it is believed that certain of the sulfur-containing impurities undergo reaction in the presence of the oxidizing agent to give other products which have increased caustic solubility or higher boiling points and which are thus removed more efficiently from the alcohol by the separation of the caustic solution, by simultaneous or separate washing, and by the subsequent distillation operation. The marked improvement in alcohol purity is indicated by the improvement in Hazen ester color of the phthalate ester, as noted when the esters are prepared from phthalic anhydride and the treated isooctyl alcohol with stainless steel strips present in the esterification mixture during the reaction.

It is considered within the scope of this invention, although not as a preferred modification, that various types of oxidizing agents which exert a chemical oxidizing effect can be used, such as hydrogen peroxide and alkaline potassium permanganate. It is considered best for operation to use an oxidizing agent of a mild type and one which is chemically compatible with an alkaline scrubbing operation which is conducted simultaneously. It is also possible to employ pure oxygen or synthetic mixtures of oxygen plus an inert gaseous diluent rather than air. Both from the effectiveness of treatment and convenience, as well as economy of operation, it is much preferred to employ air or oxygen-containing gas as the oxidizing agent rather than a chemical oxidant.

It is especially unusual and unexpected that a treatment with air and an aqueous caustic solution would show such outstandingly desirable purification effects with a water immiscible alcohol product such as those of the $C_8$ and $C_9$ class. Since there are more or less two phases present during the treatment stages, it would be expected that beneficial purifications would not be obtained. The actual results show a surprising and unexpected improvement in the Hazen ester colors when a caustic treatment is accompanied by aeration, and there is essentially complete recovery of alcohol being treated. This indicates that during the treatment the alcohol product suffers little or no degradative attack which would result in a loss in alcohol recovery. Thus, although such a treatment, as described herein has been found to be highly desirable for purification of oxo alcohols of the $C_8$ and $C_9$ water-immiscible range, it would not be of great use in purification of the lower molecular weight alcohols showing an appreciable water-miscibility since the purification would not be so selective and at least a portion of the alcohol would be attacked by the air or other oxidizing agent used in the treatment operation. Thus the octyl and nonyl alcohols are shown to be surprisingly stable toward the oxidation while the impurities causing color and odor problems are quite unstable and reactive toward the oxidizing agents and are particularly responsive to an air treatment.

In following the preferred embodiment of this invention, the treatment is used for purification of an alcohol which is produced by the oxo synthesis, that is, oxonation of an olefin followed by hydrogenation. Prior to treatment, it is required that the crude alcohol as taken from the hydrogenator must undergo at least one topping operation, that is, an operation in which materials more volatile than the alcohol itself are removed by volatilization. The resulting topped alcohol is subsequently contacted with an aqueous caustic solution with simultaneous exposure to an oxygen-containing gas, preferably air. This treatment operation should be permitted sufficient time so that the action of the air and caustic can convert the impurities into appropriate derivatives such that they can be removed from the finished, distilled alcohol. Following this soaking operation, the alcohol is subjected to a fractionation, preferably under reduced pressure. The alcohol product is removed as an overhead vapor stream and the bottoms are withdrawn from the lower portion of the column.

The type of caustic considered to be most suitable for the treatment is an aqueous sodium hydroxide solution of from 10 to 50 weight percent caustic strength. Very low concentrations of alkali may result in incomplete quality improvement as well as in troublesome emulsion formation and the use of such alkali treatment will do so particularly if air is being passed violently through the alcohol. Potassium hydroxide gives distinctly inferior results to those obtained when caustic is used. It is best to employ the caustic in an aqueous solution.

The treatment with air and caustic solution should be carried out in such a manner as to assure very fast and thorough mixing of the two phases, but at the same time avoiding emulsion formation as much as possible. It may be necessary to add an emulsion inhibitor to the system to prevent subsequent difficulties in separation of the two phases. For continuous operations a treating process can be employed with arrangement for injecting air at a single location or at a plurality of locations during the caustic treatment. For best results, an orifice or baffle type mixer giving very intimate contact may be used.

The time of contact necessary to produce a good quality alcohol and one which can be converted to an ester meeting requirements of color, varies, depending both on the concentration and kind of impurities in the alcohol as well as their susceptibility to oxidative treatment. Other variables present in the operation are the concentration of caustic solution, the temperature conditions, volume of air or oxygen containing gas per unit volume of alcohol being treated, holding time prior to distillation and the exact operation of the rerun distillation column used following the air-caustic treatment. For instance, the longer the time of exposure to the caustic solution and the air, the better the quality of alcohol generally. It has been found that sulfur-containing oxo alcohols are not satisfactory for ester preparation after one-hour treatment with air and caustic at steam bath temperatures. Thus, it is believed that contact times of from at least one hour up to twenty-four hours should be employed for best results, always keeping in mind the economies of a process such that the soaking time will not be excessive. This time feature can be suitably adjusted by varying the caustic concentration, the input of treating air, and the treating temperature. The temperature at which the treating operation is carried out is considered to be critical in that a satisfactory temperature must be employed in order to provide the treating operation which will produce maximum results in product quality improvement. Markedly better results are manifest when the caustic washing operation is carried out at temperatures above room temperature and in the range of 100° C. Generally, prolonged heating at temperatures above 100° C. are to be avoided since degradation takes place upon long heating of the oxo alcohols.

It is of prime importance to use sufficient caustic to effect removal of substantially all the alkali-sensitive impurities. A large excess will be uneconomical and can cause loss of alcohol product. Generally for a crude oxo alcohol, an amount of aqueous caustic of from 0.5 to 50 volume percent based on the alcohol being treated is satisfactory. Typical ratios employed are about five parts of alcohol to one part of alkali. The amount of air required should be preferably 1 to 100 times the theoretical amount necessary to convert the sulfur present as the mercaptan to disulfide sulfur. Generally, it is desirable to have an excess of air since it is not always possible to determine with a great degree of accuracy the exact amount of mercaptan sulfur present as alcohol impurity.

Referring particularly to diisooctyl phthalate, the presence of only a few parts per million of sulfur as mercaptan sulfur results in severe corrosion of stainless steel equipment during esterification. In addition, other unspecified types of sulfur compounds may also contribute to this corrosion. Thus, use of the exact amount of air corresponding to the mercaptan-disulfide conversion may not be desirable to give the best quality improvement, at least a small excess of air being preferable.

Since it is considered that the temperature is to be kept at least in the range of approximately 100° C., the treatment can be carried out conveniently at or near atmospheric pressure, and it is frequently most convenient to do so. It has been found, however, that the subsequent distillation operation gives best overall results when it is carried out under reduced pressure.

It is contemplated to be within the scope of this invention to carry out successive air and caustic treatment operations on the alcohol. The air treatment should ordinarily accompany or immediately follow the caustic treatment. Since the alcohol undergoing treatment will ordinarily be at least partially water immiscible and, therefore, relatively insoluble in the caustic wash solution, the alcohol and caustic mixture is taken to a phase separator or settling tank in which there are formed two phases, an aqueous caustic phase containing the dissolved impurities removed from the alcohol, and an organic phase of the purified alcohol.

The aqueous phase is separated and reused as wash liquid, if desired, provided it is not completely spent by absorption of reactive impurities in the alcohol. The alcohol, by the preferred mode of operation, is subjected to at least one water washing to remove last traces of caustic and solubilized impurities. The washing operation is especially necessary if the next step is to be a distillation or rectification of the alcohol since during distillation, the alkali content of the oxo alcohol should be held to a minimum to avoid undesirable side reactions and decomposition in the column. In normal type of operations, a distillation step will follow the air-caustic treatment as a distillation is considered to be necessary.

The types of alcohol feed stock best adapted and generally those most requiring this type of air-caustic treatment are topped alcohol mixtures derived from the so-called oxo process and are water immiscible. This range generally includes alcohols above $C_4$. It is contemplated that the process will have the widest and most useful application to purification of oxo alcohols of the $C_8$ and $C_9$ range which are exactly those alcohols of most useful and desirable properties for making ester plasticizers. For instance, a typical $C_8$ feed stock which can be purified by the method herein disclosed to give a product yielding ester plasticizers of high purity and improved qualities in both odor and color may be characterized as one produced from the oxo synthesis using a $C_7$ olefin feed, the resulting crude alcohol having a boiling range of 150° F. to 800° F., and consisting essentially of 25% hydrocarbons, 60% alcohol boiling at 350°–372° F., and 15% high boiling bottoms. The alcohols are branched chain isomers of octyl alcohol and are of the primary class.

While it is not considered necessary, in certain cases oxidation inhibitors such as those of the general phenolic or amine type may be added to the air-caustic treater in order to prevent any undesirable oxidation of the oxo alcohol itself.

It has been found by actual experimental operation that the sulfur content of topped alcohol can be reduced markedly and apparently changed in type to a sulfur impurity having no color degrading qualities during esterifications by a treatment with aqueous caustic and air followed by redistillation. For example, a finished alcohol containing 83 parts per million of total sulfur showed a stainless steel phthalate ester color in excess of 5,000. When this material was subjected to air-caustic treatment followed by water wash and redistillation in a two-plate distillation tower to discard 5% of the total of the more volatile material and 15% of the bottoms, the remaining 80% heart cut gave a two-hour stainless steel phthalate ester color of values of 135 and 160.

EXAMPLE I

In one modification of the process, the topped $C_8$ oxo alcohol was treated with the treating agents shown in Table I for the indicated times and temperatures. Following the treatment, an 80% heart cut was removed from the treated alcohol by distillation. After this air-caustic treating and rerun operation, the quality improvement of the oxo alcohol was of a distinct and outstanding nature, particularly as to the improvement in ester color developed in the presence of stainless steel strips. The improvement is further indicated in the reduced sulfur content of the treated alcohol.

TABLE I

*Air-caustic treatment of finished $C_8$ isooctyl alcohol*

| Treating Agent | Time, Hrs. | Approx. Temp. °C. | Rerun | S, p. p. m. | Hazen Ester Color—2 Hr. Esterification +Stainless Steel |
|---|---|---|---|---|---|
| None | | | | 83 | 5,000 |
| 20% NaOH+Air | 2 | reflux | yes | | 500 |
| 25% NaOH+Air | 1 | do | yes | | 160 |
| 20% NaOH+Air | 24 | steam bath | yes | 25 | 500 |
| 20% NaOH+Air | 24 | room temp | yes | .34 | 225 |
| 20% NaOH+Air | 2 | reflux | yes | | 135 |
| 20% NaOH+Air | 1 | steam bath | yes | | approx. 600 |
| 20% NaOH | 1 | reflux | yes | | 5,000 |
| Air | 1 | do | yes | | 2,000 |

The effectiveness of this invention is better understood and appreciated when it is realized that a caustic treating alone or a treating with air alone of isooctyl alcohol is substantially ineffective in either reducing the sulfur content or in improving the Hazen ester color values of the ester prepared in the presence of stainless steel strips.

EXAMPLE II

Further results obtained by this process are shown in the data obtained in Table II in which the conditions and results of the indicated treatments are tabulated.

TABLE II
*Air-caustic treating of topped iso-octyl alcohol*

| Run No. | Rerun Pressure mm. Hg | Rerun Bottoms Temp. °C. | Vol. Per cent NaOH | Conc. NaOH, weight Per cent. | Treating Time, Hrs. | Temp. °C. | Vol. Per cent Air | Alcohol Yield Vol. Per cent | S, p.p.m. | Ester Hazen Color | Promoter | Treatment Time, Hrs. |
|---|---|---|---|---|---|---|---|---|---|---|---|---|
| 1 | 253 | 228 | 50 | 20 | 6 | 25 | 1000 | 59.2 | 23 | 800 | No | 24 |
| 2 | 146 | 211 | 5 | 20 | 1 | 26 | 50 | 59.1 | 19 | 520 | ² 0.1 | 24 |
| 3 | 141 | 202 | 5 | 50 | 1 | 38 | 50(O₂) | 63.7 | 16 | 325 | ² 0.1 | 24 |
| 4 | 140 | 203 | 0.5 | 50 | 1 | 25 | 50(O₂) | 58.2 | 26 | 850 | ² 0.1 | 18 |
| 5 | 142 | 204 | 0.5 | 50 | 1 | 25 | 90(air) | 58.3 | 25 | 340 | ² 0.1 | 18 |
| 6 | 132 | 203 | 5 | 50 | | 25 | ¹ 6.4 | 56.2 | 20 | 1,240 | ² 0.1 | |
| 7 | 132 | 206 | | | | | | 54.2 | 21 | 1,100 | No | |
| 8 | 760 | 290 | 50 | 30 | 6 | 25 | 2,000 | 57.7 | 24 | 2,100 | No | 16 |
| 9 | 760 | 289 | 5 | 50 | 1 | 25 | 50 | 61.6 | 38 | 2,650 | ² 0.1 | 26 |
| 10 | 760 | 290 | 50 | 30 | 6 | 100 | 1,500 | 59.6 | 24 | 1,200 | No | 16 |
| 11 | 760 | 291 | 5 | 50 | 1 | 58 | 50 | 58.8 | 26 | 2,400 | ² 0.1 | 24 |

¹ N₂ used
² Di-sec-butyl phenylenediamine

It can be seen from runs 2, 3, and 5 that quite satisfactory improvement in alcohol quality is obtained when the product from the air-caustic treatment is distilled under reduced pressure after air-caustic treating. Ester colors of the order of 325 to 520 are obtained. This is in contrast with colors of 1200 to 2650 for the material distilled at atmospheric pressure. When this treatment is applied to crude alcohols, colors of 3200 to 7000 are obtained for the diisooctyl phthalate in crude form.

The quality of the product alcohol was evaluated in the experiments shown in Table II by determining the color of the crude ester when esterifying phthalic anhydride with 20% to 30% molar excess of alcohol in the presence of a freshly sandblasted strip of stainless steel of type 304. The color is expressed on the Hazen-platinum-cobalt scale. When no treatment is used, an alcohol containing 41 p. p. m. S has a Hazen color of 12,000.

EXAMPLE III

This example can best be understood by reading it with reference to the diagrammatic sketch of the proposed process as shown in the figure. In this sketch, auxiliary equipment such as pumps, overflow weirs, and vapor traps, which would be obvious to one skilled in the art have been omitted for the sake of clarity. A $C_8$ alcohol fraction which was prepared by the polymerization of a mixed $C_3$-$C_4$ olefin stream of petroleum origin followed by subjecting this olefin stream in successive stages to carbonylation and catalytic hydrogenation is continuously passed by inlet line 1 into an intermediate point of fractionation column 2. Fractionation column 2 is a conventional type distillation column suitably equipped with bubble caps or fractionating plates and arranged for maintaining reflux conditions and heat control conditions by means of a reboiler. Fractionation column 2 is preferably operated at or near atmospheric pressure. There is removed overhead by line 3 a light or low-boiling overhead stream of volatile material having a boiling range above that of the $C_8$ alcohol. This overhead stream is passed from line 3 into condenser 4 wherein it is liquefied. From condenser 4 at least a part of the liquid is refluxed back to column 2 by means of line 6 in order to maintain the appropriate reflux ratio. At least a part of the liquefied material is removed from the system by means of line 7, thus separating the volatile heads cut from the alcohol by a preliminary topping operation. From the lower portion of the column through line 8, there is removed the materials boiling in the range of the $C_8$ alcohol as well as materials boiling above the alcohol, this fraction including the desired alcohol materials as well as impurities produced during the carbonylation and hydrogenation stages. This topped fraction contains the sulfur-containing impurities which cause color difficulties during esterification with the alcohol and which this process is particularly designed to render innocuous. At least a part of the alcohol fraction is returned to the fractionation column 2 by means of lines 9 and 11 after passing through reboiler 10 which maintains distillation within the column. The remaining fraction of alcohol together with the impurities which it is desired to treat, is passed via line 8 to the treater 14 which is suitably equipped with stirring apparatus capable of maintaining vigorous agitation. Into treater 14 there is passed an amount of aqueous sodium hydroxide of concentration about 20 wt. per cent and in an amount of about 25 vol. per cent based on the quantity of alcohol being treated. Treater 14 is also suitably equipped with a number of gas jets connected with inlet line 13 through which air is passed at a rate of about 50 times the theoretical amount necessary to convert all the sulfur present in the impurities to disulfides, calculating that all the sulfur present is in the mercaptan form. The treating operation is conducted at a temperature of approximately 100° C. Following this treating operation, the alcohol is passed by line 15 to a soaker 30 in which it is agitated and allowed to remain in contact with the aqueous caustic solution and with any entrapped air which has been carried from treater 14. This soaking operation may advantageously occupy a period of approximately 24 hours, during which time the impurities in the alcohol undergo changes effected by the fact that the alcohol is in contact with the caustic solution and is simultaneously saturated with air. Following the soaking operation, the alcohol is passed by line 31 to a phase separator 16 wherein the alcohol is separated from the aqueous phase. The aqueous alcohol mixture is allowed to settle and the alcohol is removed by line 17. The water is discarded through line 32. The alcohol is passed via line 17 into an intermediate portion of a second fractionating tower 18 which is preferably operated under vacuum. The alcohol may be washed with water to remove traces of caustic prior to distillation. Vacuum is maintained in this tower by means of vacuum line 18–a. Preferably this tower is operated under such conditions of subatmospheric pressure that temperatures substantially below 240–260° C. are continuously maintained throughout the column. From the overhead portion of column 18, there is removed by line 19 a substantially pure alcohol product in which the sulfur content has been markedly decreased and, in addition, the remaining sulfur present in the alcohol has been rendered incapable of creating extensive color difficulties when carrying out esterifications with the finished alcohol. The alcohol vapor stream in line 19 is passed to condenser 20 wherein it is liquefied. From condenser 20 the liquid alcohol is passed through line 21 and thereafter a part is refluxed by line 22 back to column 18 while at least a portion is removed as substantially pure $C_8$ oxo alcohol product. From the lower portion of vacuum column 18 by line 24 there is removed the high-boiling materials. A part of these high-boiling bottoms is passed through lines 28 and 26 and through reboiler 25 back to column 18, while at least a portion of the bottoms are removed from the system by means of outlet line 27.

The product alcohol may be dried by conventional method such as distillation, treatment with silica gel, etc.

What is claimed is:

1. A process for the purification of a topped, primary, water-immiscible alcohol having from 4 to 20 carbon atoms, to be used for the esterification of organic acids, and produced by the oxo reaction followed by hydrogenation, giving a product containing sulfur impurities which cause undesirable colored impurities during subsequent esterification which comprises the steps of subjecting said topped alcohol to a liquid phase contacting with an aqueous caustic solution of from 10 to 50 wt. per cent concentration, the volume of aqueous caustic being in the range of from 0.5 to 50 volume per cent based on the alcohol being treated; simultaneously aerating the alcohol by saturating with air, at temperatures of from 30°–100° C., for a period of time of from one to twenty-four hours; permitting the mixture to stratify into a lower aqueous layer containing the sulfur-containing impurities converted to water-soluble products and an upper alcohol layer; separating the thus treated alcohol from the aqueous layer and distilling the thus treated alcohol.

2. The process as in claim 1 in which the topped water-immiscible alcohol is a mixture of $C_8$ alcohols.

3. The process as in claim 2 in which the caustic is sodium hydroxide.

CARL S. CARLSON.
WILLIAM E. CATTERALL.
JOHN H. STAIB.

REFERENCES CITED

The following references are of record in the file of this patent:

UNITED STATES PATENTS

| Number | Name | Date |
|---|---|---|
| 2,139,179 | Tulleners | Dec. 6, 1938 |
| 2,188,274 | Bump | Jan. 23, 1940 |
| 2,356,689 | Ozol et al. | Aug. 22, 1944 |
| 2,486,693 | Spijker et al. | Nov. 1, 1949 |